Sept. 17, 1968    KOJI TAGAWA    3,402,321
AUTOMATIC CHANGEOVER SWITCHING FROM IDLE
POSITION TO RUNNING POSITION
Filed Sept. 14, 1966    2 Sheets-Sheet 1

INVENTOR.
Koji Tagawa
BY
Michael S. Striker
Atty

Sept. 17, 1968 KOJI TAGAWA 3,402,321
AUTOMATIC CHANGEOVER SWITCHING FROM IDLE
POSITION TO RUNNING POSITION
Filed Sept. 14, 1966 2 Sheets-Sheet 2
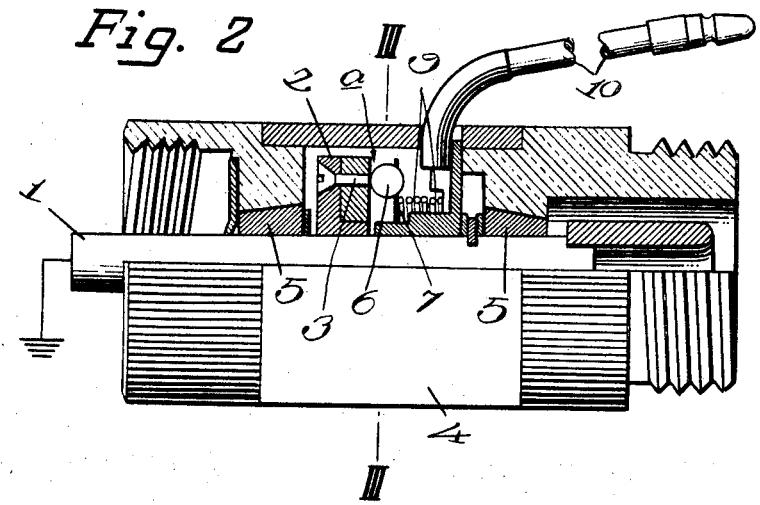
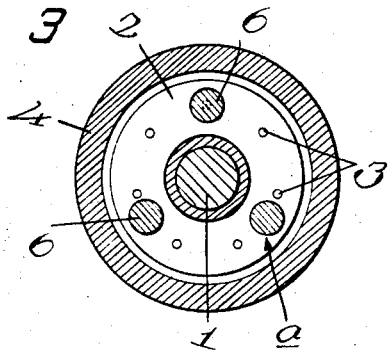
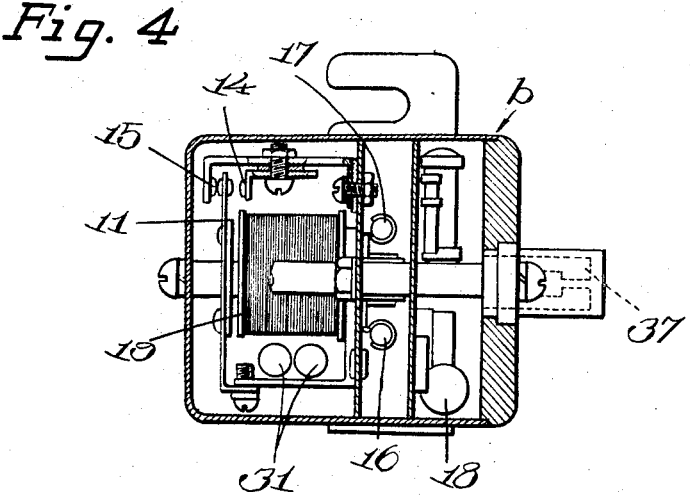
INVENTOR.
Koji Tagawa
BY
Michael S. Striker
ATTY

United States Patent Office 3,402,321
Patented Sept. 17, 1968

3,402,321
AUTOMATIC CHANGEOVER SWITCHING FROM
IDLE POSITION TO RUNNING POSITION
Koji Tagawa, 1892 Kokubu, Ebinamachi, Kozagun,
Kanagawa Prefecture, Japan
Filed Sept. 14, 1966, Ser. No. 579,337
10 Claims. (Cl. 315—83)

ABSTRACT OF THE DISCLOSURE

An arrangement for switching power between the head lamps and the parking lights of a motor vehicle. The parking lights are connected to the battery of the motor vehicle when the latter is stationary or in the idling state in which the gas pedal is released. When the gas pedal is depressed so as to place vehicle into motion, the battery becomes connected to the head lamps and disconnected from the parking lights. The switching between the lamps is performed by a relay which becomes energized when the gas pedal is depressed. A pulse emitter is mechanically coupled to the driving shaft of the vehicle and supplies a train of pulses having a frequency substantially proportional to the speed of the driving shaft. It is the purpose of the pulse emitter to maintain the lights of the head lamps on immediately after the gas pedal has been released and the motor vehicle is in a gliding state. This is accomplished by applying the trains of pulses to the coil of a relay. When the duration between pulses becomes longer due to a slow-down in the motion of the vehicle, the relay coil becomes eventually de-energized and the battery becomes switched to the parking lights, As a result the head lamps are maintained lighted for as long as the driving shaft rotation exceeds a predetermined magnitude. When the speed of rotation of the driving shaft drops below this predetermined level, the head lamps are automatically switched off and the parking lights are turned on.

---

The present invention relates to the automatic changeover switch device of the head lights and the smaller lights of motor cars.

An object of the present invention is to supply an automatic changeover switch device of the head lights and the smaller lights of motor cars so adapted as to have the head lights lighted while a motor car is running during the nights, and the head lights put out when the motor car has stopped running for awaiting the signal for pass or for some other reasons, and to have the smaller lights, not lighted while the motor car is running, lighted automatically simultaneously.

Another object of the present invention is to supply an automatic changeover switch device of the head lights and the smaller lights of motor cars, wherein a rotary switch mechanism being connected to the rotary shaft of a speedometer connected to the driving rotary shaft of a motor car and the interrupting action of contacts being maintained while the motor car is running, making the emitter of a pulse signal possible by said contact interrupting action, and which signal pulse being amplified and rectified whereby the magnetic coil of a changeover contact piece changing-over the circuits of the head lights and the smaller lights being excited and thereby the changeover contact piece is enabled to get contact with the head lights side.

A further object of the present invention is to supply an automatic changeover switch device of the head lights and the smaller lights of motor cars, wherein a magnetic coil working on the changeover contact piece of the pulse signal emitting amplifier rectifying circuit of said contact being connected to an accelerator switch working by the pressed rotation of an accelerator plate, whereby the insufficiency of excitation of said magnetic coil being compensated when the emitting frequency of the pulse signal caused by said contact interruption in the running condition of the motor car at a very slow speed while the motor car is being changed to its starting condition from its standstill condition by the action of the accelerator switch at its starting time, whereby the changeover action of the changeover contact piece at the starting time of the motor car is assured.

A still further object of the present invention is to supply an automatic changeover switch device of the head lights and the smaller lights of motor cars, wherein while a motor car is running and when the accelerator plate is being worked, the accelerator switch being worked, whereby D.C. current being impressed to the magnetic coil of said changeover contact piece, and when the accelerator plate is not being pressedly worked as in the case where the motor car is running, down a slope or as in the case where the speed of the motor car is being reduced, the pulse signal emitted by the contact interruption action of said rotary switch being amplified and rectified and impressed to the magnetic coil of the changeover contact, thus while the motor car is running at a desired speed, the magnetic coil being always excited, whereby the changeover contact piece being attracted and thereby is so made as to have it changed-over to the head lights side.

Still another object of the present invention is to supply an automatic changeover switch device for motor cars, wherein even in the case when the running speed of a motor car has become slow immediately prior to the stop of the motor car, in other words even in the case when the frequency of the contact interrupting action of said rotary switch has become small, by the discharge action of a condenser inserted into the emission amplifier rectifying circuit an exciting voltage being given to the magnetic coil, whereby it is so made as to have the changeover contact piece connected with the contact of the head lights.

That is, the purport of the present invention is to supply an automatic changeover switch device for motor cars wherein a rotary switch mechanisms is addedly provided on a rotary portion rotating in cooperation with the running of a motor car, a pulse emission being performed in response to the speed of the motor car, the pulse being amplified and rectified, and being connected with the excitation coil of the changeover contact piece that enabled to changeover the contacts of the smaller lights and the head lights, and at the same time said exciting coil is connected with an electric source through the accelerator switch working by the action of the accelerator plate.

FIG. 2 is an enlarged partly sectional view of a rotary switch mechanism;

FIG. 3 is a section taken along the line III—III of FIG. 2; and

FIG. 4 is a section through the unit mechanism of an amplifier rectifying circuit.

Figure 1:
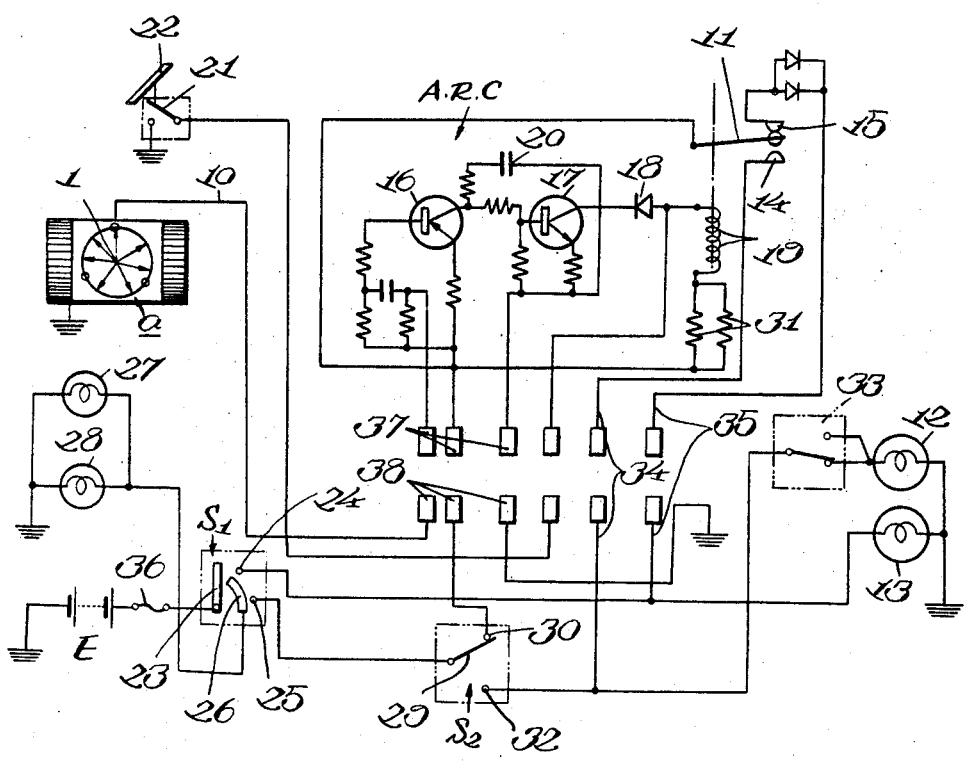
FIG. 1 is a diagram of the electric circuit of the improved changeover switch device.

Now, describing an embodiment according to the present invention with reference to the accompanying drawings, numeral 1 which is shown in FIGS. 1 to 3 indicates a rotary shaft rotating in relation with the running of a motor car, a rotary shaft in relation with a speedometer, for instance 2, a rotary contact disk of a rotary switch mechanism *a* rigidly mounted on said rotary shaft 1 and contacts 3, 3, . . . in a plurality with desired spacings in an annular form coaxial with said shaft 1 as the center being installed mutually communicated on one side surface thereof and so as to maintain mutual insulation on the other side surface thereof. Numeral 4 indicates the outer cylindrical body of said rotary switch mechanism *a*, maintaining the rotary shaft 1 on the central axis thereof by bearings 5, 5, and at the same time said rotary contact disk 2 being interposed between said bearings 5, 5, and further a ball contact 6 in one or in a plurality so made as enabled to slidingly contact with the contacts 3, 3, . . . of said rotary contact disk 2 being provided on a plane disk 7, whereby is electrically connected with the conductive coil spring 9 of a stationary body 8 affixed to the outer cylindrical body 4. That is, it is worked in combination so as the product of the number of the contacts 3, 3, . . . provided on the rotary contact disk 2 and the number of the ball contact 6 maintains the number of rotation contacting in one rotation of the rotary shaft 1. Numeral 10 indicates the connecting conductor of the conductive coil spring 9.

Numeral 11 (see also FIG. 4) indicates a changeover contact piece that is enabled to perform changeover operation of the contacts 14, 15 of the head lights 12 and the smaller lights of a motor car each independently, being made to oppose an exciting coil 19 provided with a pair of amplifier transistors 16, 17 and also provided with the unit mechanism *b* of an amplifier rectifying circuit A.R.C. connected with a diode 18, whereby contact changeover operation is made possible. Numeral 20 indicates a condenser connected with the amplifier rectifying circuit A.R.C. of said unit mechanism *b* and is made to perform the charge and discharge of electricity. Numeral 21 indicates an accelerator switch provided underneath an accelerator plate 22, and a kind of a push button mechanism such as that immediately closes when the playable rotary range held by the accelerator plate 22 is surpassed is constituted therein. Numeral 23 indicates a movable piece of the main switch S1 installed on the front surface of the motor car, a contact 24 lighting the smaller lights 13 in connection with an electric battery 24 and the contact 25 of the head lights being parallelly provided, and a contact 26 being common for both said contacts 24, 25 and it is so connected to have a tail light 27 and a number plate light 28 lighted even when connected with either contact. Numeral 29 indicates the movable contact piece of an emergency switch S2 connected with said contact 25, and it is so arranged to be enabled when connected with a contact 30, as to have the positive voltage of the electric battery source connected with the emitter side of the first step transistor 16 of the amplifier rectifying circuit A.R.C., and being connected with the changeover contact piece 11, and also so wired as to be connected with one side of the exciting coil 19 through a resistor 31 and communicated with said accelerator switch 21 connected with the other side of the exciting coil 19.

Numeral 32 indicates the other contact of the movable contact piece 29 and is connected with the head lights 12 through a dimmer switch 33. Numeral 34 indicates conductors connecting the head lights, 35 conductors connecting the smaller lights 13 and the contact 15, 36 a fuse, 37 the conductor connectors of the unit mechanism *b*, and 38 the conductor connectors of another mechanism detachable from said conductor connectors.

Now, the working of the present invention will be described based on the structure described above in the following.

Assuming a case wherein a motor car is run during the night with the movable contact piece 23 of the main switch S1 connected with the contact 25 side with having the movable contact piece 29 of the emergency switch S2 changed-over to the contact 30 side.

Then, as the tail light 27 and the number plate light 28 are connected with the electric source battery being lighted normally, and at the same time, as the exciting coil 19 attracting the changeover contact piece 11 does not work when the motor comes to standstill, the smaller lights 13 get lighted by the conductor 35 connected with the contact 15, and the lighting circuit of the head lights being open, the head lights do not get lighted.

Thus, at the time of starting the motor, when the acceleration plate 22 is pressed down sufficiently, the acceleration switch 21 being closed and being connected with the contact 30 of the emergency switch S2 through the resistor 31 provided on one side of said exciting coil 19 from the other end of the exciting coil 19, whereby since the closed circuit of the electric source battery is constituted, the exciting coil 19 being excited, the changeover contact piece 11 thereof being attracted, and since the changeover of contact from the contact 15 to the side of the contact 14 is performed, the motor car can be run with the head lights 12 lighted through the conductor 24.

Next, in the case when the acceleration action is stopped while running, the acceleration switch 21 becoming open condition, the closed circuit of the exciting coil is open, but under such a circumstance contact interruption action taking place by the rotary switch mecanhism *a* rigidly mounted on the rotary shaft, whereby since a pulse current being generated, said pulse signal being supplied to the amplifier rectifying circuit A.R.C., the positive voltage obtained by having the pulse signal amplified by the transistors 16, 17 and rectified by the diode 18 can be impressed to the exciting coil 19 and thereby the excited condition of the exciting coil can be firmly secured.

When the running speed of the motor car is significantly lowered in the case of the slow running or the stopping of the motor car, since the operation of the accelerator is not naturally performed, but rather a controlling action is imparted to the motor car, the number of rotation of the rotary shaft is very much lowered, and the frequency of the pulse emission getting very much smaller, in consequence the exciting force of the exciting coil gets weaker, the attractive force thereof getting lowered, whereby the attraction of the changeover contact piece 11 becomes impossible, but the condenser 20 in the amplifier rectifying circuit A.R.C. performing a discharge action, and thereby electricity being supplied to the exciting coil 19, assisting the attraction of the changeover contact piece 11, and the interrupting action is continued until the motor car has completely stopped.

When the motor car has completely stopped, of course the release of the accelerator switch 21 takes place and since the contact interrupting action of the rotary switch mechanism rigidly mounted on the rotary shaft 1 comes also to standstill, the pulse emission stops, the voltage working on the exciting coil disappears and by the self-recovery action thereof the changeover contact piece 11 being changed-over from the contact 14 to the contact 15, whereby it is made possible to have the head lights put out and the front blinkers lighted.

Since the present inventon is so constructed as described hereinabove, at the time of running and stopping the motor car during the night the changeover make and unmake of the head lights and the smaller lights being above to perform automatically, and as the result thereof the consumption of the battery current being reduced, the dizzy feeling against motor cars and pedestrians crossing at the crossing point being removed, and at the same time has the effect of removing complication at the time of operating a motor car by simplifying the changeover of the lights performed in the night operation of the motor car.

What is claimed is:

1. A light-switching arrangement in motor vehicles, comprising, in combination, first lamp means on said motor vehicle for providing the driving light; second lamps means on said motor vehicle having a light intensity substantially smaller than said first lamp means for indicating the presence of said vehicle at night-time; a source of electrical energy for applying power to said lamp means; first switching means connected between said source of energy and said lamp means for switching between said first and second lamp means the power applied from said source of energy; second switching means actuated by the gas pedal of said motor vehicle and connected to said first switching means for transferring power from said second lamp means to said first lamp means when said gas pedal is displaced to a driving position, said second lamp means being connected to said source of energy by said first switching means when said motor vehicle is stationary; pulse emitter means mechanically coupled to the driving shaft of said motor vehicle and providing a train of electrical pulses having a frequency dependent upon the speed of said shaft, said train of pulses being applied to said first switching means; and pulse circuit means connected between said pulse emitter means and said first switching means for applying a signal to said first switching means whereby said first lamp means is connected to said source of energy until said driving shaft is stationary after said gas pedal has been released from its driving position, said second lamp means being connected to said source of energy when said driving shaft is substantially stationary.

2. The light switching arrangement in motor vehicles as defined in claim 1, wherein said first switching means is a relay energized and actuated by said second switching means and said pulses from said pulse emitter means.

3. The light switching arrangement in motor vehicles as defined in claim 2, wherein said relay is a single pole double-throw relay having one movable contact and two stationary contacts alternately connected to said movable contact, each one of said stationary contacts being connected to one of said lamp means.

4. The light-switching arrangement in motor vehicles as defined in claim 1, wherein said second switching means comprises a single pole normally open switch actuated to the closed circuit position when said gas pedal is displaced to a driving position of said motor vehicle.

5. The light-switching arrangement in motor vehicles as defined in claim 1, including amplifier means connected to said pulse emitter means for amplifying said pulses and applying the amplified pulses to said first switching means.

6. The light-switching arrangement in motor vehicles as defined in claim 5, including rectifier means for rectifying the pulses amplified by said amplifying means.

7. The light-switching arrangement in motor vehicles as defined in claim 6, including storage means for storing a predetermined number of accumulated pulses to be applied to said first switching means after said gas pedal is released from its displaced position associated with the driving state of said motor vehicle.

8. The light-switching arrangement in motor vehicles as defined in claim 7, wherein said storage means comprises an electrical capacitor.

9. The light-switching arrangement in motor vehicles as defined in claim 5, wherein said amplifying means comprises a two stage transistor amplifier.

10. The light-switching arrangement in motor vehicles as defined in claim 1, wherein said source of electrical energy comprises a DC battery.

References Cited
UNITED STATES PATENTS

| | | | |
|---|---|---|---|
| 1,951,495 | 3/1934 | Trafton | 315—79 |
| 2,045,274 | 6/1936 | Kundig | 315—79 |
| 2,480,370 | 8/1949 | Jaynes | 315—79 X |
| 2,900,570 | 8/1959 | Kennedy | 315—79 X |

JAMES W. LAWRENCE, *Primary Examiner.*

C. R. CAMPBELL, *Assistant Examiner.*